United States Patent [19]
Zakula

[11] Patent Number: 5,603,525
[45] Date of Patent: Feb. 18, 1997

[54] AIR BAG INFLATOR INITIATOR HOUSING WITH STORED FLUID PRESSURE RELIEF

[75] Inventor: Mitchell P. Zakula, Tempe, Ariz.

[73] Assignee: TRW Inc., Lyndhurst, Ohio

[21] Appl. No.: 493,689

[22] Filed: Jun. 22, 1995

[51] Int. Cl.$^6$ ............................................. B60R 21/26
[52] U.S. Cl. ............................................. 280/737; 280/741
[58] Field of Search ............................... 280/736, 737, 280/741, 742; 137/68.1; 220/89.1, 89.2

[56] References Cited

U.S. PATENT DOCUMENTS

| | | | |
|---|---|---|---|
| 3,642,304 | 2/1972 | Johnson et al. | 222/5 |
| 3,806,153 | 4/1974 | Johnson. | |
| 3,960,390 | 6/1976 | Goetz | 280/731 |
| 3,968,980 | 7/1976 | Hay | 280/737 |
| 4,131,300 | 12/1978 | Radke et al. | 280/737 |
| 4,858,951 | 8/1989 | Lenzen | 280/741 |
| 5,031,932 | 7/1991 | Frantom et al. | 280/741 |
| 5,199,740 | 4/1993 | Frantom et al. | 280/736 |
| 5,346,251 | 9/1994 | Burnard et al. | 280/737 |
| 5,378,018 | 1/1995 | Ketterer et al. | 280/737 |

FOREIGN PATENT DOCUMENTS

| 2443267 | 3/1975 | Germany | 280/737 |
|---|---|---|---|

Primary Examiner—Paul N. Dickson
Attorney, Agent, or Firm—Tarolli, Sundheim, Covell, Tummino & Szabo

[57] ABSTRACT

An air bag inflator (20) comprises a container (22) defining a chamber (42) for storing inflation fluid under pressure. The container (22) has an opening (44) through which the inflation fluid flows from the chamber (42) for inflating an air bag. An initiator (26, 226, 326, 426) includes a housing (84, 240, 328, 428) which contains an actuatable device (164). A closure (86, 242, 344, 464) forms a portion of the housing (84, 240, 328, 428) and is fixed to the container (22) to block the flow of inflation fluid from the chamber (42). The housing (84, 240, 328, 428) is rupturable in response to actuation of the actuatable device (164) and is rupturable in response to the pressure of the inflation fluid in the chamber (42) reaching a predetermined pressure when the actuatable device is unactuated. The housing may rupture in different areas (102, 108, 122, 246, 262, 362, 364, 386, 464, 484) depending on whether the rupture occurs in response to actuation of the actuatable device or in response to the pressure of the inflation fluid reaching the predetermined pressure.

28 Claims, 6 Drawing Sheets

AIR BAG INFLATOR INITIATOR HOUSING WITH STORED FLUID PRESSURE RELIEF

BACKGROUND OF THE INVENTION

1. Technical Field

The present invention relates to an air bag inflator. In particular, the present invention relates to an air bag inflator having an actuatable initiator.

2. Description of the Prior Art

One type of air bag inflator includes a container defining a chamber for storing an inflation fluid under pressure. The inflator includes an initiator which, when actuated, initiates the flow of inflation fluid into the air bag. It is desirable in certain situations, such as when the inflator is exposed to elevated temperatures, to release the inflation fluid from the chamber to prevent the pressure of the inflation fluid in the chamber from increasing excessively.

SUMMARY OF THE INVENTION

The present invention is directed to an air bag inflator having an actuatable initiator and a closed chamber for storing an inflation fluid under pressure. A housing is constructed to open the chamber and release the inflation fluid, upon actuation of the initiator, to inflate the air bag. The housing of the initiator is also constructed to open the chamber and release the inflation fluid when the initiator is unactuated and the pressure of the inflation fluid in the chamber increases to a predetermined pressure.

The air bag inflator comprises an initiator and a container defining a chamber for storing inflation fluid under pressure. The container has an opening through which the inflation fluid flows to inflate an air bag. The initiator includes a housing which contains actuatable means. A closure forms part of the initiator housing and is fixed to the container to block the flow of inflation fluid from the chamber through the opening in the container. The initiator housing is rupturable in response to actuation of the actuatable means to release the inflation fluid from the chamber. The initiator housing is also rupturable in response to the pressure of the inflation fluid in the chamber reaching a predetermined pressure when the actuatable means is unactuated.

The initiator housing comprises a first area of the closure which ruptures in response to actuation of the actuatable means and a second area of the closure which ruptures in response to the pressure of the inflation fluid in the chamber reaching the predetermined pressure when the actuatable means is unactuated. The initiator housing also includes a tubular portion connected to the closure. The first area of the closure is located radially inside of the tubular portion and the second area of the closure is located radially outside of the tubular portion. The first area preferably comprises an annular stress riser formed in the closure. The second area comprises an annular stress riser formed in a flange portion of the closure.

A third area located on the tubular portion of the initiator housing is rupturable in response to actuation of the actuatable means and, at times, in response to the pressure of the inflation fluid in the chamber reaching the predetermined pressure when the actuatable means is unactuated. The third area comprises a circumferentially extending stress riser formed in the tubular portion.

The initiator housing may, alternately, include only one weakened area on the tubular portion and one weakened area on the closure which is located radially inside of the tubular portion. Both weakened areas rupture in response to actuation of the actuatable means and in response to the pressure of the inflation fluid in the chamber reaching the predetermined pressure when the actuatable means is unactuated.

A portion of the closure located inside the tubular portion of the initiator housing has a first thickness taken in a direction parallel to a longitudinal central axis of the tubular portion. A portion of the closure located outside the tubular portion has a second thickness substantially equal to the first thickness. The initiator housing is formed by impact extruding so the closure and the tubular portion are integrally formed as one piece. Alternately, the portion of the closure located outside the tubular portion has a second thickness which is substantially twice the first thickness. The initiator housing, alternately, may be formed by cold headed drawing.

BRIEF DESCRIPTION OF THE DRAWINGS

Further features and advantages of the present invention will become apparent to those skilled in the art to which the present invention relates from reading the following specification with reference to the accompanying drawings, in which.

DESCRIPTION OF PREFERRED EMBODIMENTS

Figures 1, 3, 4:
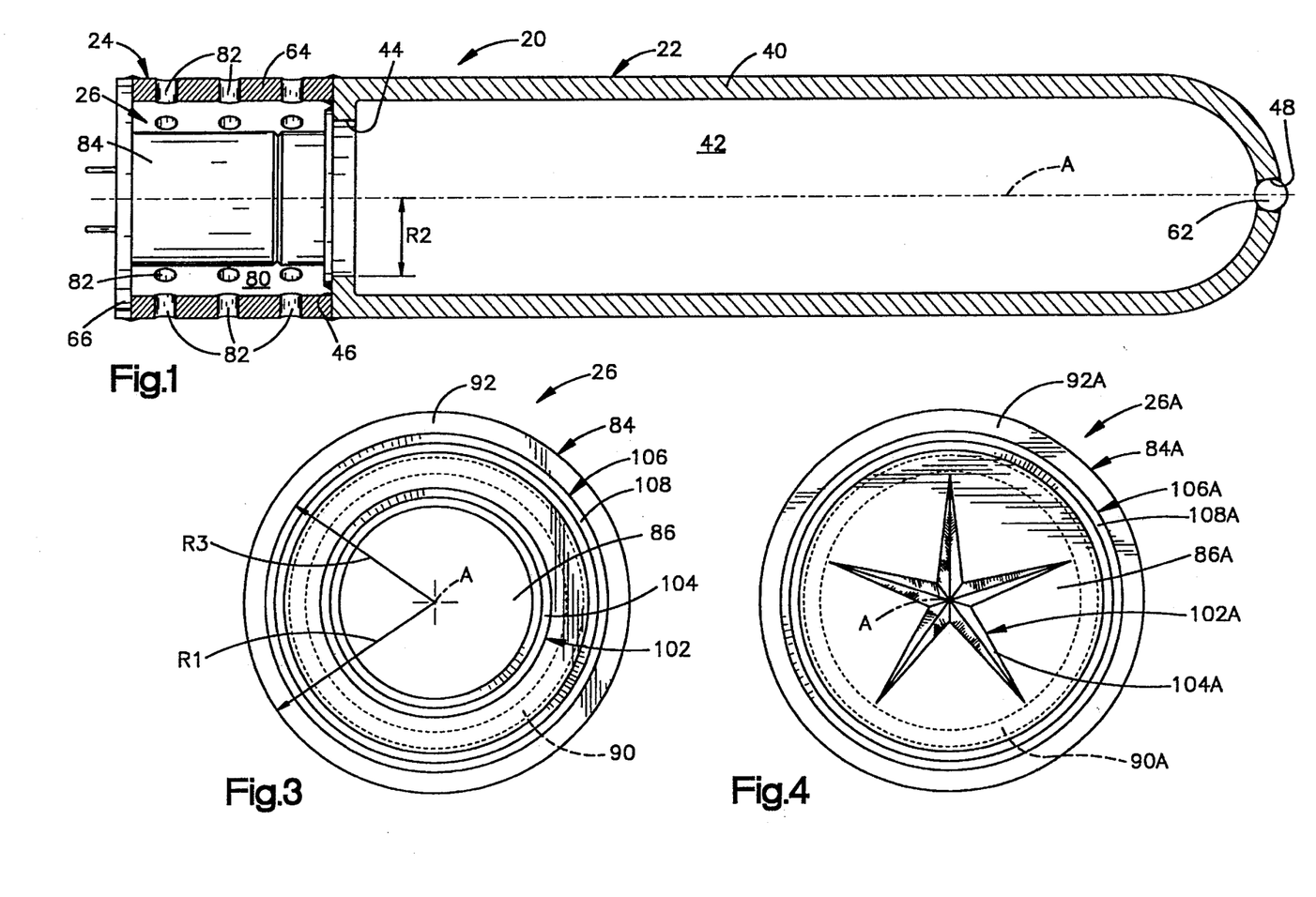
FIG. 1 is a schematic longitudinal view, partly in section, of an air bag inflator having an initiator embodying the present invention.
FIG. 3 is an end view of the initiator of FIG. 2, taken approximately along the line 3—3 in FIG. 2.
FIG. 4 is a view similar to FIG. 3 illustrating an alternate construction of the initiator.

An inflator 20 for inflating an inflatable vehicle occupant protection device, such as an air bag (not shown), is illustrated in FIG. 1. The inflator 20 has a longitudinal central axis A. The inflator 20 includes a container 22, a diffuser 24 and an actuatable initiator 26 embodying the present invention, all of which are located coaxially along the axis A.

The diffuser 24 is located axially adjacent the container 22. The initiator 26 is located radially inside of the diffuser 24. It will be apparent that while an elongated inflator 20 is illustrated and described, as is typically used in a side impact air bag assembly, any type of inflator for use in various inflatable air bag applications, such as in a driver side air bag or in a passenger side air bag, may employ the initiator 26 of the present invention.

Figure 2:
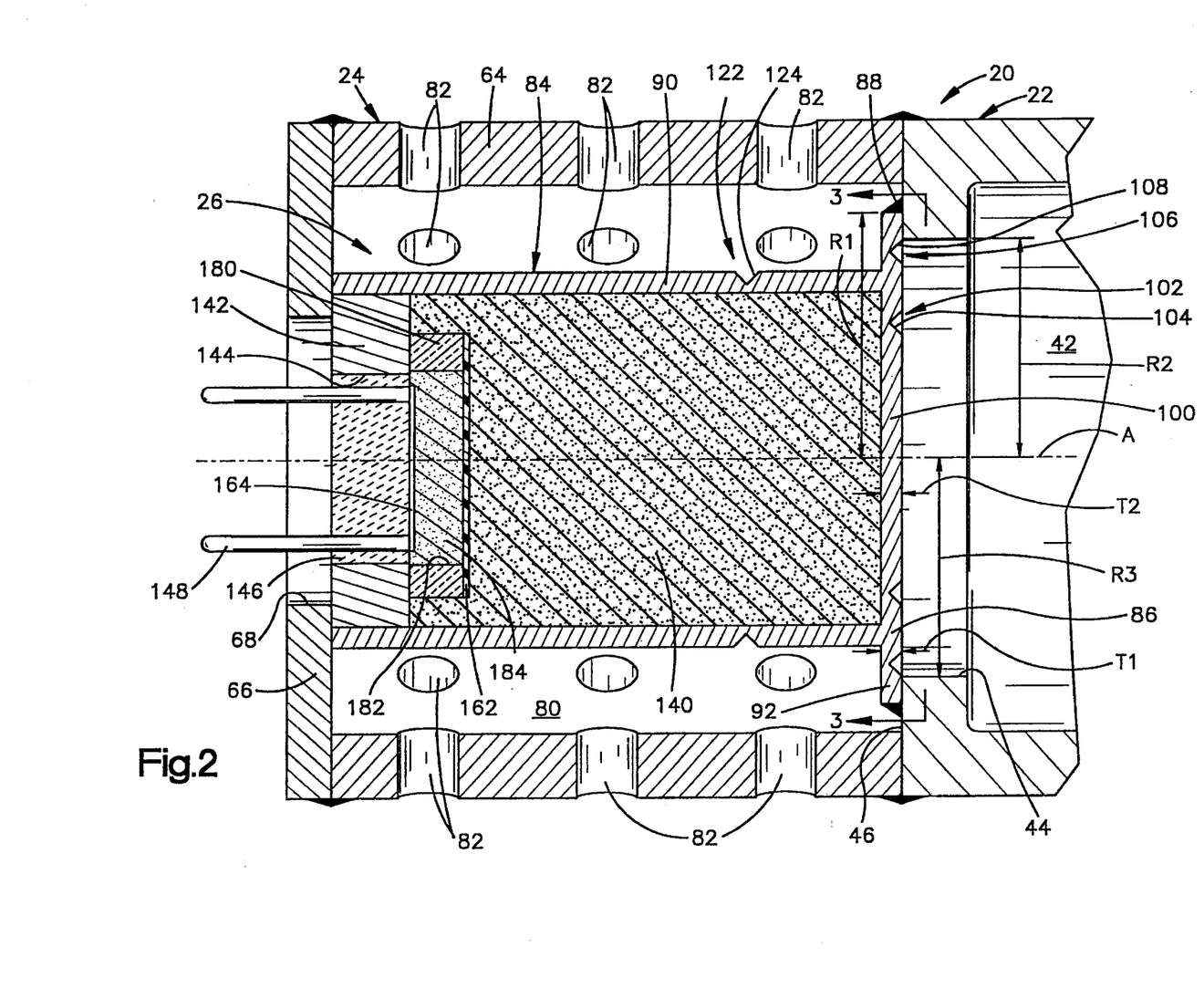
FIG. 2 is an enlarged sectional view of the initiator of FIG. 1.

The container 22 defines a major portion of a chamber 42 and is a tubular member 40 substantially closed at one axial end, to the right as viewed in FIGS. 1 and 2. The container 22 is preferably made from a metal, such as an aluminum alloy or a steel alloy. The chamber 42 is initially closed and stores inflation fluid under pressure which, when released from the chamber 22, inflates the air bag. The inflation fluid is preferably a non-ignitable inert gas, such as argon or nitrogen, or a combination of inert gases.

The container 22 has a circular opening 44 at one axial end of the tubular member 40, to the left as viewed in FIGS. 1 and 2. An annular end surface 46 of the container 22 defines and surrounds the opening 44. When the chamber 42 is open, the inflation fluid flows through the opening 44 into the diffuser 24 and is directed into the air bag. The initiator 26 closes the chamber 42 for the inflation fluid by extending across the opening 44 of the container 22. The right end of the initiator 26 thus initially blocks the inflation fluid from flowing out of the chamber 42. The container 22 also includes a fill opening 48 at its axial end opposite the opening 44. A plug 62 fixed in the fill opening by a weld to seal and close the fill opening and the right end of the container 22.

The diffuser 24 comprises a metal tube 64 which is open at both axial ends. The right axial end of the tube 64, as viewed in FIGS. 1 and 2, is welded to the left annular end surface 46 of the container 22. An annular end plate 66 is made from metal and has a central opening 68 (FIG. 2) which is welded to the left end of the tube 64. The end plate 66 engages the left end of the initiator 26 to support the initiator.

The diffuser 24 includes a plurality of radially extending passages 82 formed in the tube 64. The passages 82 direct inflation fluid from within the tube 64 into the air bag. The passages 82 may be of any suitable number, size and pattern that is desired for a specific air bag installation.

When the container 22, diffuser 24 and initiator 26 are assembled and fixed together, they define a diffuser chamber 80 between the diffuser and the initiator. The diffuser chamber 80 communicates with the air bag through passages 82, but is initially isolated by the initiator from the chamber 42 which stores the inflation fluid under pressure. The diffuser chamber 80 is placed in fluid communication with the chamber 42 upon actuation of the initiator 26 or when the pressure within the chamber increases to a predetermined pressure.

The initiator 26 includes a housing 84. The housing 84 is preferably made of a metal, such as an aluminum alloy or a steel alloy. The initiator housing 84 has a circular closure 86 at one axial end, to the right as viewed in FIG. 2, which is fixed to the annular end surface 46 of the container 22. The closure 86 of the initiator housing 84 blocks the opening 44 of the container 22 and closes the chamber 42 for the inflation fluid. An annular weld bead 88 extends around the outer circumference of the closure 86 to fix the initiator housing 84 to the annular end surface 46 of the container 22 and to seal the chamber 42.

The initiator housing 84 also has a tubular portion 90 fixed to the closure 86. Preferably, the closure 86 and tubular portion 90 are formed in one piece by an impact extruding operation. A flange 92 is formed as part of the closure 86 and is located radially outside of the tubular portion 90. The outer radius R1 of the flange 92 of the closure 86 is greater than the radius R2 of the opening 44.

Figure 5:
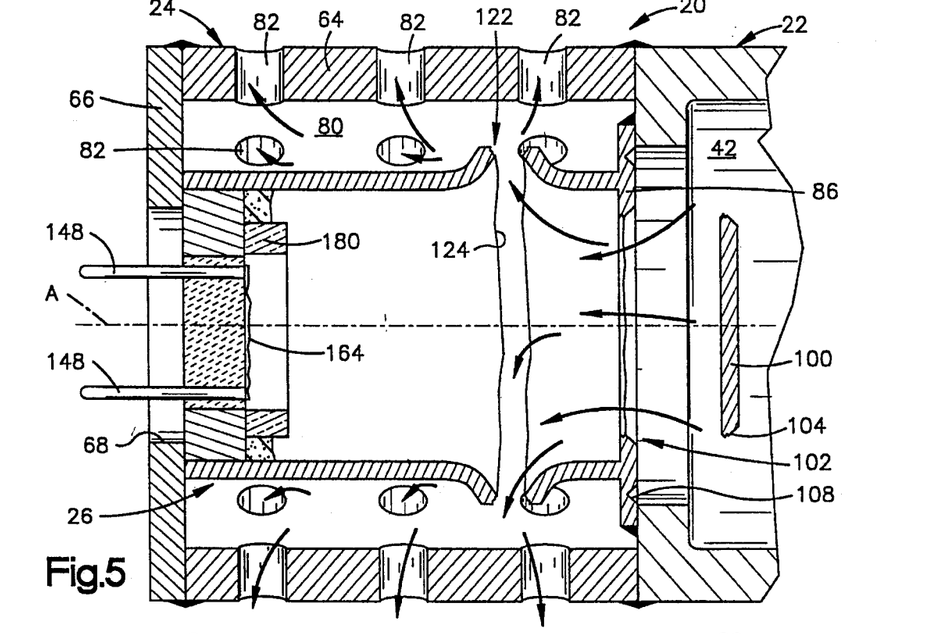
FIGS. 5 and 6 are views similar to FIG. 2, illustrating parts of the initiator of FIG. 2 in alternate ruptured conditions.

The closure 86 of the initiator housing 84 has a central region 100 located radially inside of the tubular portion 90 with a first weakened area 102 (FIGS. 2 and 3). The first weakened area 102 of the closure 86 is preferably defined by an annular stress riser 104 formed in a surface of the central region 100 of the closure which faces to the right, as viewed in FIG. 2. The stress riser 104 is formed on the closure 86 during the impact extruding operation. The first weakened area 102 of the closure 86 is rupturable in response to actuation of the initiator 26. The first weakened area 102 ruptures in a predetermined manner when the initiator 26 is actuated, as illustrated in FIG. 5.

The closure 86 also has a second rupturable weakened area 106 which is located in the flange 92 radially outside of the tubular portion 90. The second weakened area 106 is preferably defined by another annular stress riser 108 formed in the flange 92 of the closure 90. The annular stress riser 108 has an outermost radius R3 which is no greater than the radius R2 of the opening 44 of the container 22. The second weakened area 106 ruptures in a predetermined manner when the initiator 26 is unactuated and the pressure of the inflation fluid in the chamber 42 increases and reaches the predetermined pressure.

The flange 92 of the closure 86 has a thickness T1, measured in a direction substantially parallel to the axis A and at a location away from the weakened area 106, of about 0.008 inch. The central region 100 of the closure 86 has a thickness T2 at a location away from the weakened area 102. The thickness T1 of the flange 92 is substantially equal to the thickness T2 of the central region 100.

The tubular portion 90 of the initiator housing 84 includes a third rupturable weakened area 122 defined by a circumferential stress riser 124 formed in the outer surface of the tubular portion. The third weakened area 122 ruptures in a predetermined manner, together with the first weakened area 102, when the initiator 26 is actuated, as illustrated in FIG. 5. Rupturing of the third weakened area 122 permits inflation fluid, which flows into the housing 84 upon rupturing of the first weakened area 102, to flow out of the housing into the diffuser chamber 80.

The volume defined by the closure 86 and the tubular portion 90 of the housing 84 preferably contains a quantity of an output pyrotechnic 140 which ignites upon actuation of the initiator. The initiator 26 also includes a metal end plug 142 which seals the end of the tubular portion 90 of the housing 84 axially opposite the closure 86. The end plug 142 has an opening 144 containing a glass insulating material 146. Electrical connectors 148 extend through the glass insulating material 146. The glass insulating material 146 prevents electrical communication between the metal end plug 142 and the electrical connectors 148.

The electrical connectors 148 extend through the opening 68 in the end plate 66 for electrical connection with a sensor (not shown). A bridgewire 164 extends radially between the electrical connectors 148 to provide localized electrical communication between the electrical connectors. A polycarbonate member 180 is fixed to the end plug 142 inside the housing 84 and has a chamber 182 of a relatively small volume. A quantity of ignition pyrotechnic 184 is located in the chamber 182 adjacent the bridge wire 164. A consumable insulation disk 162 made of mylar or other suitable material is located adjacent the member 180 and the ignition pyrotechnic 184 to electrically insulate the ignition pyrotechnic. This disk 162 is held in place against the member 180 by a suitable adhesive.

When the initiator 26 is actuated, electric current flows through the connectors 148 to heat the bridgewire 164, which ignites the ignition pyrotechnic 184 in a relatively short time. The ignition pyrotechnic 184 then ignites the output pyrotechnic 140 to produce combustion products. Burning of the output pyrotechnic 140 causes a pressure increase inside of the initiator housing 84 which ruptures the closure 86 at the first weakened area 102 and at the third weakened area 122 of the tubular portion 90, as illustrated in FIG. 5. Continued burning of the output pyrotechnic 140 also heats the inflation fluid as the inflation fluid flows through the housing 84 and into the diffuser chamber 80 before the inflation fluid is directed into the air bag.

It should be apparent that the initiator 26 may be constructed without using any output pyrotechnic 140. Alternatively, the initiator 26 may include an actuatable igniter, as is known in the air bag inflator art. The known igniter, when actuated, mainly produces pressure inside of the housing 84 of the initiator 26. The increased pressure also is sufficient to rupture the first weakened area 102 of the closure 86 and the third weakened area 122 of the tubular portion 90. The inflation fluid is then free to flow from the chamber 42 into the diffuser chamber 80 without being heated to any substantial degree, since the output pyrotechnic is not present.

Figure 6:
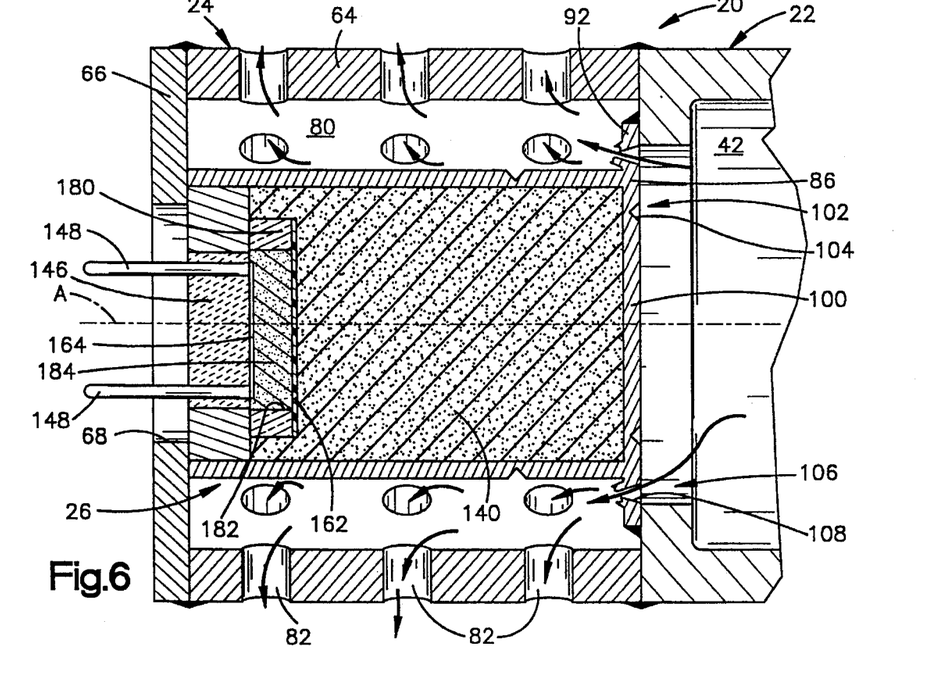

FIG. 6 illustrates the rupture of the second weakened area 106 in the flange 92 of the closure 86. The second weakened area 106 ruptures when the initiator 26 is not actuated and the pressure of the inflation fluid in the chamber 42 increases to a predetermined pressure. The predetermined pressure is higher than occurs under normal circumstances in the chamber 42 but lower than the pressure which would cause the container 22 to burst. When the pressure of the inflation fluid in the chamber 42 reaches the predetermined pressure, the stress riser 108 in the flange 92 ruptures, as illustrated in FIG. 6. Once the second weakened area 106 of the closure 86 ruptures, the inflation fluid flows from the chamber 42 directly into the diffuser chamber 80 around the outside of the unruptured portions of the housing 84.

An alternate embodiment of an initiator housing 84A of an initiator 26A, is illustrated in FIG. 4, and includes a first weakened area 102A on a closure 86A. The first weakened area 102A is defined by a stress riser 104A having a star shape. The star-shaped stress riser 104A is located radially inside of a tubular portion 90A of the housing 84A of the initiator 26A. The alternate star-shaped stress riser 104A replaces the annular stress riser 104, illustrated in FIG. 3. A cruciform shaped stress riser may also be provided to define the first weakened area 102A.

Figure 7:
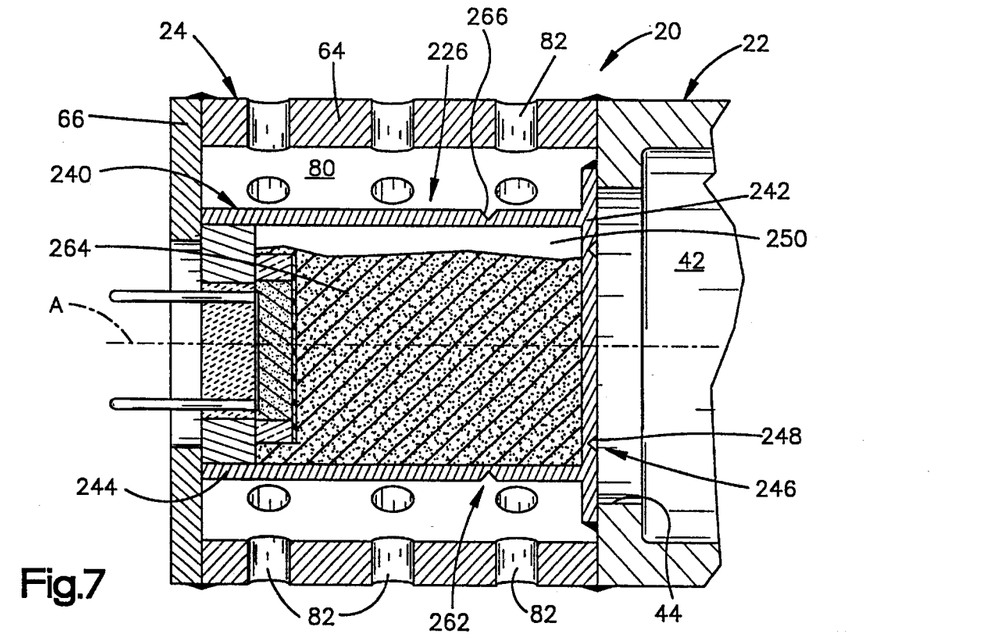
FIG. 7 is a view similar to FIG. 2, illustrating an alternate embodiment of the initiator.

FIG. 7 illustrates an alternate embodiment of an initiator 226 of the present invention used in the inflator 20. The initiator 226 includes a housing 240 similar to the initiator 26 illustrated in FIG. 2. The initiator housing 240 has a closure 242 and a tubular portion 244 formed in one piece with the closure during an impact extruding operation. The initiator 226 is formed with a single rupturable weakened area 246 on the closure 242. The weakened area 246 is located radially inside of the tubular portion 244 of the housing 240.

Figure 8:
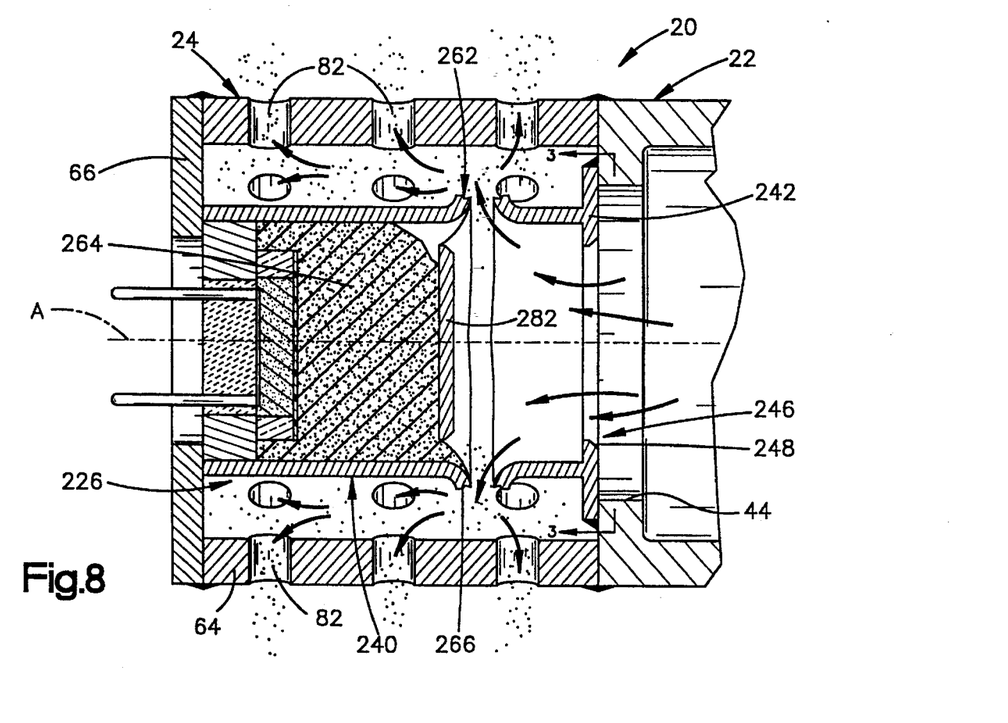
FIG. 8 is a view similar to FIGS. 5 and 6, illustrating parts of the initiator of FIG. 7 in a ruptured condition.

The weakened area 246 of the closure 242 is defined by an annular stress riser 248. The weakened area 246 ruptures in a predetermined manner to define a central portion 282 that can separate from the housing 240 in response to actuation of the initiator 226 and in response to pressure within the chamber 42 increasing to the predetermined pressure when the initiator 226 is unactuated. When the initiator 226 is not actuated and the pressure of the inflation fluid in the chamber 42 increases to reach the predetermined pressure, the weakened area 246 of the closure 242 will rupture, as illustrated in FIG. 8.

Another weakened area 262 of the housing 240 is defined by a circumferential stress riser 266 in the tubular portion 244 of the housing 240. The weakened area 262 ruptures both in response to actuation of the initiator 226, similar to what is illustrated in FIG. 5 for the initiator housing 84, and in response to pressure of the inflation fluid in the chamber 42 increasing to the predetermined pressure when the initiator is unactuated, as illustrated in FIG. 8.

The initiator housing 240 preferably contains an output pyrotechnic 264. The interior of the initiator housing 240 is loaded between 50% and 80% of its capacity with the output pyrotechnic 264 to provide void space 250 for the broken away central portion 282 to occupy after breakage, as illustrated in FIG. 8. When the initiator housing 240 ruptures in response to the pressure increase of the inflation fluid in the chamber 42, the output pyrotechnic 264 redistributes to fill the void space 250 and stops movement to the left of the broken away central portion 282 of the closure 242. The inflation fluid and some of the output pyrotechnic 264, located to the right of the weakened area 262, flows outward of the diffuser 24 through the passages 82, as illustrated in FIG. 8. When the initiator 226 is actuated, the housing 240 will rupture in a manner similar to that illustrated in FIG. 5 for the initiator 26.

It should be apparent that the initiator 226 may also be constructed without any output pyrotechnic. The initiator 226 may contain an actuatable igniter that produces pressure inside of the housing 240 to rupture the weakened areas 246, 262 upon actuation.

Figure 9:
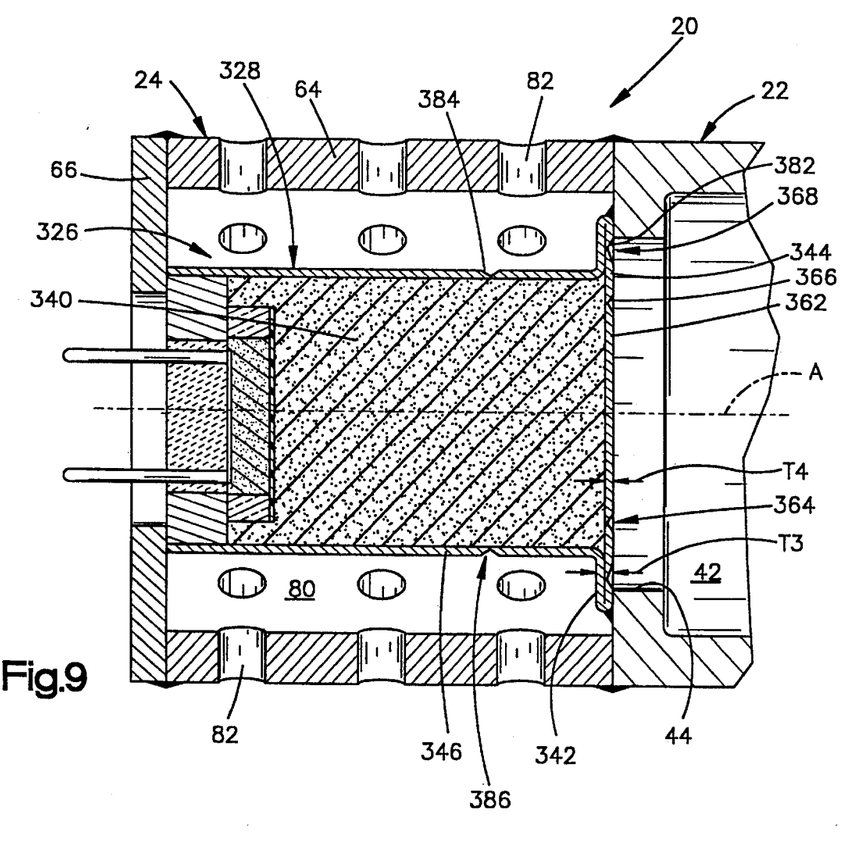
FIG. 9 is a view similar to FIG. 2, illustrating another alternate embodiment of the initiator.

FIG. 9 illustrates the inflator 20 having an initiator 326 constructed according to another alternate embodiment of the present invention. An initiator housing 328 is preferably formed by a cold headed deep drawing operation and preferably contains an output pyrotechnic 340. The initiator housing 328 has a flange 342 located on a closure 344. The flange 342 is located radially outward of a tubular portion 346 of the housing 328.

The flange 342 is welded to the container 22 to close the chamber 42. The flange 342 has a thickness T3, measured in a direction parallel to the axis A of the inflator 20. A central region 362 of the closure 344 is located radially inward of the tubular portion 346 and has a thickness T4 of approximately 0.008 inch. The thickness T3 is approximately twice the thickness T4 because the manufacturing operation used to form the flange 342 essentially doubles the material in this part of the housing 328.

An annular stress riser 366 is formed in the central region 362 at a location inside of the tubular portion 346 and defines a first weakened area 364 of the closure 344. Another annular stress riser 382 is located in the flange 342 and defines a second weakened area 368 of the closure 344. A circumferential stress riser 384 is formed in the tubular portion 346 of the housing 328 and defines a third weakened area 386 of the tubular portion.

The initiator housing 328 ruptures in two modes which are similar to the rupture modes, illustrated in FIGS. 5 and 6, for the initiator 26. When the initiator 326 is actuated, the housing 328 ruptures at the stress risers 366, 384 in the first and third weakened areas 364, 386 in response to a pressure increase inside the housing 328 due to ignition of the output pyrotechnic 340. When the initiator 326 is not actuated and the pressure of the inflation fluid in the chamber 42 increases to the predetermined pressure, the housing 328 will rupture at the stress riser 382 in the flange 342 of the closure 344.

It should be apparent that the initiator 326 may also be constructed without any output pyrotechnic. The initiator 326 may contain an actuatable igniter that produces pressure inside of the housing 328 to rupture the weakened areas 364, 386 upon actuation.

Figure 10:
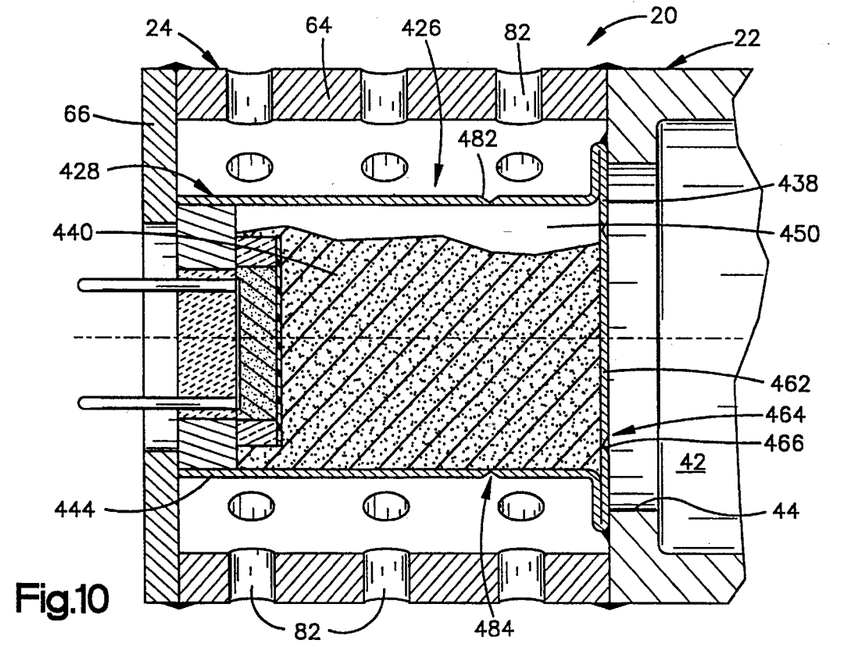
FIG. 10 is a view similar to FIG. 2, illustrating yet another alternate embodiment of the initiator.
Figure 11:
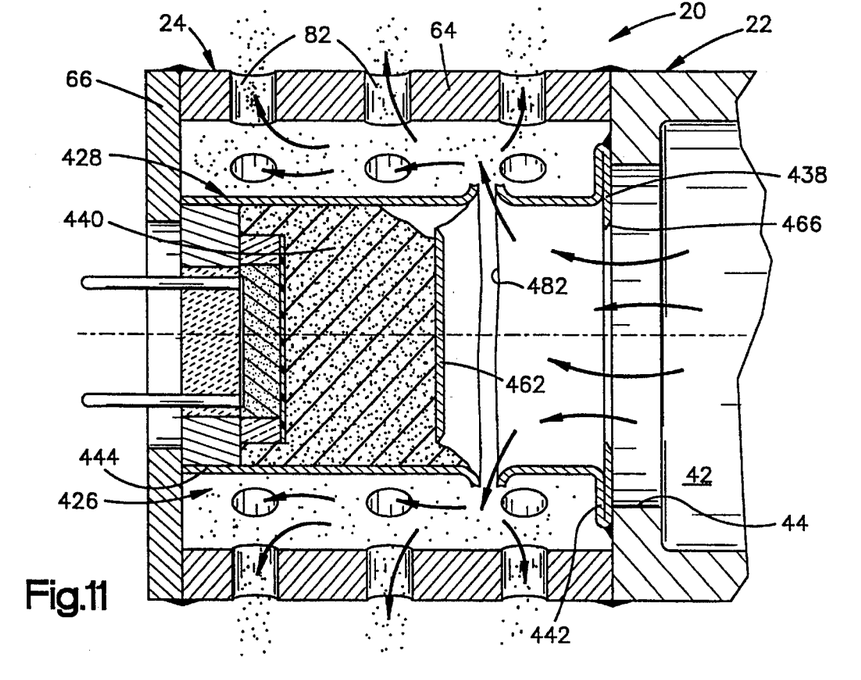
FIG. 11 is a view similar to FIG. 8, illustrating parts of the initiator of FIG. 10 in a ruptured condition.

The inflator 20 may also include an initiator 426 with a housing 428 constructed according to yet another alternate embodiment, as illustrated in FIG. 10. The initiator housing 428 is similar to the initiator housing 328, illustrated in FIG. 9. The initiator housing 428 preferably contains an output pyrotechnic 440. The initiator housing 428 is partly filled with the output pyrotechnic to provide a void space 40. The initiator housing 428 includes a closure 438. However, a flange 442 of the closure 438 has no stress riser located radially outward of a tubular portion 444. The flange 442 is welded to the container 22 so the closure 438 extends across the opening 44 to close the chamber 42 and block the flow of inflation fluid from the chamber.

The initiator housing 428 has a central region 462 of the closure 438. An annular stress riser 466 defines a weakened area 464 in the closure 438. The initiator housing 428 also has a circumferential stress riser 482 in an outer surface of the tubular portion 444 to define another weakened area 484 in the housing. Thus, the initiator housing 428 will rupture in a similar manner to the initiator 226, illustrated in FIG. 7, both upon actuation of the initiator 426 and when the initiator is not actuated but the pressure of the inflation fluid in the chamber 42 increases to the predetermined pressure.

It should be apparent that the initiator 426 may also be constructed without any output pyrotechnic. The initiator 426 may contain an actuatable igniter that produces pressure inside of the housing 428 to rupture the weakened areas 464, 484 upon actuation.

From the above description of the invention, those skilled in the art will perceive improvements, changes and modifications. Such improvements, changes and modifications within the skill of the art are intended to be covered by the appended claims.

Having described the invention, the following is claimed:

1. An air bag inflator comprising:

a container defining a first chamber for storing inflation fluid under pressure, said container having an opening through which the inflation fluid from the first chamber flows to inflate an air bag;

a housing including a closure portion fixed to said container to block flow through the opening, said housing defining a second chamber;

actuatable means in the second chamber in said housing for, when actuated, producing pressure within the second chamber in said housing; and said closure portion of said housing rupturing in response to a pressure increase within the second chamber of said housing due to actuation of said actuatable means and rupturing in response to pressure in the first chamber reaching a predetermined pressure when said actuatable means is unactuated;

wherein said housing comprises a first area which ruptures in response to actuation of said actuatable means and a second area which ruptures in response to the pressure in the chamber reaching a predetermined pressure when said actuatable means is unactuated; and wherein said housing further includes a tubular portion having a longitudinal central axis and being connected to said closure portion, said first area being located radially inside of said tubular portion and said second area being located radially outside of said tubular portion.

2. The inflator of claim 1 wherein a portion of said closure portion located radially inside of said tubular portion has a first thickness taken in a direction parallel to the longitudinal central axis of said tubular portion and a portion of said closure poprtion located radially outside of said tubular portion has a second thickness substantially equal to the first thickness.

3. The inflator of claim 1 wherein a portion of said closure portion located inside of said tubular portion has a first thickness taken in a direction parallel to the longitudinal central axis of said tubular portion and a flange of said closure portion located outside of said tubular portion has a second thickness substantially twice the first thickness.

4. The inflator of claim 1 further including a third area on said tubular portion of said housing which is rupturable in response to actuation of said actuatable means.

5. The inflator of claim 4 wherein said third area comprises a stress riser formed in a peripheral surface of said tubular portion and extends transversely relative to the longitudinal central axis of said tubular portion.

6. The inflator of claim 1 wherein said first area is defined by an annular stress riser.

7. The inflator of claim 1 wherein said second area is defined by an annular stress riser.

8. An air bag inflator comprising:

a container defining a first chamber for storing inflation fluid under pressure, said container having an opening through which the inflation fluid from the first chamber flows to inflate an air bag;

a housing including a closure portion fixed to said container to block flow through the opening, said housing defining a second chamber; and actuatable means in the second chamber in said housing for, when actuated, producing pressure within the second chamber in said housing;

said closure portion of said housing rupturing in response to a pressure increase within the second chamber of said housing due to actuation of said actuatable means and rupturing in response to pressure in the first chamber reaching a predetermined pressure when said actuatable means is unactuated;

said housing further including a tubular portion connected to said closure portion and wherein said housing comprises a weakened area on said closure portion located inside of said tubular portion and a weakened area on said tubular portion.

9. An air bag inflator comprising:

a container defining a chamber for storing inflation fluid under pressure, said container having an opening through which inflation fluid from the chamber flows to inflate an air bag;

a housing including a closure portion fixed to said container to block the flow of inflation fluid from the chamber through the opening;

ignitable output pyrotechnic located in said housing; and a closure comprising a portion of said housing and being fixed to said container to block the flow of inflation fluid from the chamber;

said closure portion of said housing rupturing in response to ignition of said output pyrotechnic and rupturing in response to pressure in the chamber reaching a predetermined pressure;

wherein said housing comprises a first area which ruptures in response to ignition of said output pyrotechnic and a second area which ruptures in response to the pressure in the chamber reaching said predetermined pressure; and wherein said closure portion includes a flange having a first extent in a direction transverse to a central axis of said housing, the opening in said container having a second extent in the direction transverse to the central axis of said housing, the first extent being greater than the second extent, and wherein the second area comprises a weakened area having a third extent in the direction transverse to the central axis of said housing, said third extent being less than or equal to the second extent.

10. An air bag inflator comprising:

a container defining a chamber for storing inflation fluid under pressure, said container having an opening through which inflation fluid from the chamber flows to inflate an air bag;

a housing including a closure portion fixed to said container to block the flow of inflation fluid from the chamber through the opening;

ignitable output pyrotechnic located in said housing; and a closure comprising a portion of said housing and being fixed to said container to block the flow of inflation fluid from the chamber;

said closure portion of said housing rupturing in response to ignition of said output pyrotechnic and rupturing in response to pressure in the chamber reaching a predetermined pressure;

wherein said housing comprises a first area which ruptures in response to ignition of said output pyrotechnic and a second area which ruptures in response to the pressure in the chamber reaching said predetermined pressure; and wherein said housing further includes a tubular portion having a longitudinal central axis and being connected to said closure portion, said first area being located radially inside of said tubular portion and said second area being located radially outside of said tubular portion.

11. The inflator of claim 10 wherein a portion of said closure portion located radially inside of said tubular portion has a first thickness taken in a direction parallel to the longitudinal central axis of said tubular portion and a portion of said closure portion located radially outside of said tubular portion has a second thickness substantially equal to the first thickness.

12. The inflator of claim 10 wherein said housing is formed by an impact extrusion process and wherein said closure portion and said tubular portion are formed together in one piece.

13. The inflator of claim 10 wherein a portion of said closure portion located inside said tubular portion has a first thickness taken in a direction parallel to the longitudinal central axis of said tubular portion and a flange of said closure portion located outside said tubular portion has a second thickness substantially twice the first thickness.

14. The inflator of claim 13 wherein said housing is formed by a cold headed drawing process and wherein said closure portion and said tubular portion are formed together in one piece.

15. The inflator of claim 10 further including a third area on said tubular portion of said housing which is rupturable in response to ignition of said output pyrotechnic.

16. An air bag inflator comprising:

a container defining a first chamber for storing inflation fluid under pressure;

a diffuser defining a second chamber and having a passage for directing inflation fluid into an air bag;

an initiator housing located in the second chamber and containing an output pyrotechnic; and a closure portion of said initiator housing blocking the flow of inflation fluid from the first chamber to the second chamber, said closure portion including a first area that is rupturable in response to ignition of said output pyrotechnic to allow the flow of inflation fluid from the first chamber, said ignition producing combustion products to heat the inflation fluid, said closure portion further including a second area that is rupturable in response to the pressure in the first chamber reaching a predetermined pressure to allow the flow of inflation fluid from the first chamber into the second chamber.

17. The inflator of claim 16 further including a third area on said housing portion which is rupturable in response to ignition of said output pyrotechnic to permit the inflation fluid to flow into said second chamber.

18. The inflator of claim 16 wherein said housing further includes a tubular portion connected to said closure portion, said first area being located radially inside of said tubular portion and said second area being located radially outside of said tubular portion.

19. The inflator of claim 18 wherein said closure portion located radially inside of said tubular portion has a first thickness taken in a direction parallel to the longitudinal central axis of said tubular portion and said closure portion located radially outside of said tubular portion has a second thickness substantially equal to the first thickness.

20. The inflator of claim 18 wherein said closure portion located radially inside of said tubular portion has a first thickness taken in a direction parallel to the longitudinal central axis of said tubular portion and said closure portion located radially outside said tubular portion has a second thickness substantially twice the first thickness.

21. An air bag inflator comprising:

a container defining a chamber for storing inflation fluid under pressure, said container having an opening through which inflation fluid from the chamber flows to inflate an air bag;

a housing including a closure portion fixed to said container to block the flow of inflation fluid from the chamber through the opening;

ignitable output pyrotechnic located in said housing; and a closure comprising a portion of said housing and being fixed to said container to block the flow of inflation fluid from the chamber;

said closure portion of said housing rupturing in response to ignition of said output pyrotechnic and rupturing in response to pressure in the chamber reaching a predetermined pressure; and wherein said housing further includes a tubular portion connected to said closure portion and wherein said housing comprises a weakened area on said closure portion located radially inside of said tubular portion and a weakened area on said tubular portion.

22. An air bag inflator comprising:

a container defining a chamber for storing inflation fluid under pressure, said container having an opening through which inflation fluid from the chamber flows to inflate an air bag;

a housing including a closure portion fixed to said container to block the flow of inflation fluid from the chamber through the opening;

ignitable output pyrotechnic in said housing;

a first area of said closure portion rupturing in response to ignition of said output pyrotechnic; and a second area of said closure portion which is different than said first area rupturing in response to pressure of inflation fluid in the chamber reaching a predetermined pressure;

wherein said housing further includes a tubular portion connected to said closure portion, said first area being located radially inside of said tubular portion and said second area being located radially outside of said tubular portion.

23. The inflator of claim 22 further including a third area located on said tubular portion, said third area being rupturable in response to ignition of said output pyrotechnic.

24. An air bag inflator comprising:

a container defining a first chamber for containing inflation fluid under pressure, said container having portions defining an opening through which inflation fluid from said first chamber flows to inflate an air bag;

an electrically actuatable initiator secured to said container for, when actuated, generating combustion products to increase the pressure of inflation fluid flowing from said first chamber, said initiator having a housing including a wall enclosing an ignitable charge;

said housing wall of said initiator being in engagement with said portions of said container defining said opening, said housing wall extending across said opening and blocking flow of inflation fluid from said first chamber, said housing wall being exposed to the pressure of inflation fluid in said first chamber;

said housing wall being rupturable upon actuation of said initiator by the force of combustion products of said initiator to enable inflation fluid to flow from said first chamber through said opening;

said housing wall being rupturable prior to actuation of said initiator by the force of inflation fluid in said first chamber when the pressure in said first chamber exceeds a predetermined pressure to enable inflation fluid to flow from said first chamber through said opening.

25. An air bag inflator as set forth in claim 24 wherein said housing wall comprises a layer of metal having first and second opposite side surfaces, said first side surface of said housing wall being in engagement with inflation fluid in said first chamber, said second side surface of said housing wall being in abutting engagement with said ignitable charge in said initiator.

26. An air bag inflator as set forth in claim 24 wherein said initiator including said housing wall and said ignitable charge is movable during assembly of said inflator between a first condition in which said housing wall of said initiator is spaced apart from said container and does not block fluid flow through said opening and a second condition in which said housing wall is in engagement with said portions of said container defining said opening and extends across said opening to block fluid flow through said opening.

27. An air bag inflator as set forth in claim 24 wherein said inflator includes a second chamber separate from said first chamber and in which said initiator is disposed, said housing wall of said initiator separating said first chamber from said second chamber and blocking fluid flow through said opening prior to actuation of said initiator, inflation fluid flowing from said first chamber into said second chamber upon rupturing of said housing wall upon actuation of said initiator, said second chamber having fluid outlets spaced apart from said opening for directing inflation fluid from said second chamber to the air bag.

28. An air bag inflator as set forth in claim 24 wherein said initiator housing is formed as one piece from metal, said housing having a generally cylindrical configuration including a cylindrical side wall centered on an axis and a radially extending first end wall formed as one piece with said side wall, said radially extending first end wall comprising said housing wall which closes said opening in said container, said initiator including two electrodes which extend into said housing through a second end of said housing opposite said first end wall.

* * * * *